April 21, 1959    J. G. HOFFMAN    2,883,012
ADJUSTABLE SLEEVE MOUNTED IN SOFT MATERIAL
FASTENER TO HARD MATERIAL
Filed Nov. 15, 1955

INVENTOR.
JAMES GORDON HOFFMAN
BY William L. Hunter
ATTORNEY.

United States Patent Office 2,883,012
Patented Apr. 21, 1959

2,883,012

ADJUSTABLE SLEEVE MOUNTED IN SOFT MATERIAL FASTENER TO HARD MATERIAL

James Gordon Hoffman, Old Greenwich, Conn.

Application November 15, 1955, Serial No. 546,961

2 Claims. (189—36)

This invention relates to a device for fastening a sheet of material to a supporting member.

Many manufactured items today require that a sheet or plate of crushable or breakable material be fastened to a plate made of a stronger material. This requirement arises, for example, in the manufacture of certain control panels for electronic equipment in which the supported panel is a sheet of plastic such as methyl methacrylate while the mounting plate is a sheet of steel. The plastic panel must be fastened tightly to the steel mounting plate so that vibration will not loosen it. When an ordinary machine screw is used to fasten the plates, it is very difficult to tighten the screw the correct amount. If the screw is too tight, the plastic panel is deformed or fractured around the screw head while if the screw is too loose the panel is not held securely against the mounting plate.

In the past, cylindrical sleeves or bushings, cut to the thickness of the plastic panel, have been placed around the mounting screws to take the strain but this expedient is not entirely satisfactory because the plastic sheets as received from the manufacturer vary considerably in thickness, both from panel to panel and from place to place on the same panel. As a result, the majority of the sleeves are either too long or too short causing either a loose fit or deformation of the panel.

It is a general object of this invention to provide apparatus for fastening two sheets of material securely together. A more specific object is to provide apparatus for fastening a deformable panel tightly to a rigid mounting plate without distorting or fracturing the supported panel.

Briefly stated, the invention employs a two element cylindrical sleeve, each portion of which has a length less than the thickness of the deformable sheet with which it is to be used. One element of the sleeve has a larger diameter than the other and is threaded on its inside surface so as to engage mating threads on the outside surface of the other element. The sleeve may thus be inserted into the hole in the sheet and adjusted so that its overall length is equal to the thickness of the sheet. Thus, when a fastener, such as a machine screw or rivet is tightened, the sleeve takes the strain yet allows the two sheets to be held in intimate contact.

For a clearer understanding of the invention, reference may be made to the following detailed description and the accompanying drawing, in which.

Figure 1:
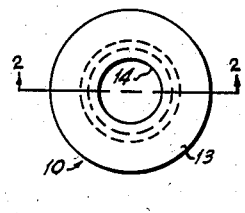
Figure 1 is a plan view of the bushing which comprises the outer element of the sleeve.
Figure 2:
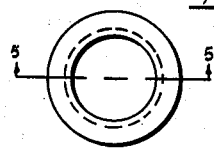
Figure 2 is a cross sectional view of the bushing taken on the line 2—2 of Fig. 1.

Referring first to Figs. 1 and 2, there is shown a bushing 10 which comprises a generally cylindrical body 11, preferably made of metal such as aluminum, brass or steel, and having threads 12 on its outer surface. A flange 13 is formed integrally with the body portion 11 and extends radially therefrom. An aperture 14 extends through the bushing along the cylindrical axis.

Figure 4:
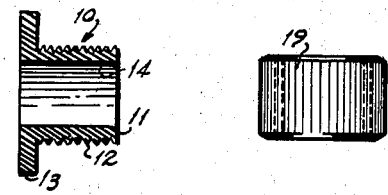
Figure 4 is an elevational view of the collar.
Figures 3, 5:
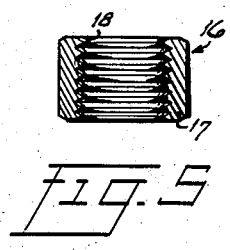
Figure 3 is a plan view of the collar which forms the inner element of the bushing.
Figure 5 is a cross sectional view taken on the line 5—5 of Fig. 3.

Figures 3, 4 and 5 show a collar 16 which forms the other part of the sleeve and which comprises a hollow cylindrical body 17 having threads 18 on the inner surface which fit the threads 12 of the bushing 10. As will be more fully explained in connection with Fig. 6, the threads 12 and 18 are usually cut as left hand threads. The collar 16 may also be made of such metal as aluminum, brass or steel and the outer surface is preferably knurled with longitudinal ribs as shown at 19 of Fig. 4.

Figure 6:
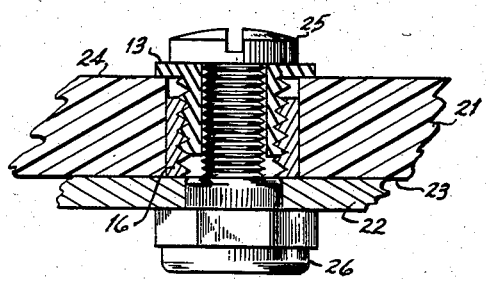
Figure 6 is a cross sectional view of the invention in use holding two sheets of material together.

Referring now to Fig. 6, there is shown a sheet of methyl methacrylate 21, such as that sold under the trade names of Lucite and Plexiglas, fastened by means of the present invention to a steel mounting plate 22. Before the sheets 21 and 22 are brought together, a hole is drilled in the sheet 21 with a diameter approximately equal to that of the collar 16 and the collar is pressed into the hole from the rear side 23 until its edge is flush with the surface 23. The knurled surface 19 holds the element 16 in place. Next the bushing 10 is screwed into the collar 16 finger tight until the flange 13 presses against the surface 24. The two sheets or plates 21 and 22 are now brought together and fastened by means of a machine screw 25 which passes through the hollow bushing 10 and collar 16 and through a corresponding hole in the mounting plate 22. An elastic stop nut 26 is shown permanently fastened to the mounting plate 22 with the screw 25 threaded into it. If, as is usually the case, the screw 25 and the nut 26 have right hand threads, bushing 10 and collar 16 will have left hand threads so that as the screw 25 is tightened, the friction of the head of the screw on the flange 13 will tend to turn the bushing 10 so as to increase the length of the sleeve. But this tendency toward an increase in length is resisted by the compressing action of the screw 25 and the nut 26. In practice, it has been found that the bushing 10 rarely turns at all as the screw 25 is tightened. Thus the sleeve retains the length selected by the finger tight adjustment and the two sheets 21 and 22 are held tightly together. The sheet 21 is not deformed because the bushing 10 and collar 16 take the strain, yet a tight fit is obtained since the sleeve has been adjusted to exactly the right length in spite of variations in the thickness of the sheet 21.

Although a specific embodiment has been described, many modifications may be made within the scope of the invention. For example, it is obvious that the screw 25 may engage a nut which is not fastened to the mounting plate 22 or the hole in the plate 22 may be tapped. If the screw 25 has a left hand thread, then, of course, the bushing and collar should have right hand threads. Also, the bushing and collar may be used with other types of fasteners such as rivets or wood screws, or to fasten sheets of other breakable materials, such as glass or wallboard, etc. Many other modifications will occur to those skilled in the art.

What is claimed is:

1. Apparatus fastening a sheet of relatively soft material to a sheet of relatively hard material comprising, a first generally cylindrical element having an axial aperture completely therethrough, female threads extending over the entire inside surface of said first element, a plurality of axially extending ribs on the outer surface of said first element, said first element having a substantially uniform outside diameter throughout its axial length, whereby said first element may be inserted into a hole in the sheet of soft material until one end is flush with one surface of said material, a second generally cylindrical element having an axial aperture completely therethrough, a radially extending flange on one end of said second element, the outside diameter of said flange being greater than the outside diameter of said first element, male threads for cooperation with said female threads extending over the entire outer cylindrical surface of said second element except for the portion occupied by said flange, whereby said second element may be threaded into said first element until said flange bears on the other surface of said sheet of soft material, a threaded bolt extending through said first and second elements and through a hole in the sheet of hard material in such a direction that the head of said bolt bears against said flange, said hole in said sheet of hard material being of smaller diameter than said hole in said soft material whereby the portion of one surface of said hard material adjacent said hole abuts said one end of said first cylindrical element while the remainder of said surface abuts said soft material, and an internally threaded member adapted to be threaded onto said bolt and engaging said hard material, the threads on said member and said bolt being of opposite hand to the threads on said first and second elements.

2. Apparatus according to claim 1 in which the axial length of said first element is less than the thickness of said sheet of soft material.

References Cited in the file of this patent
UNITED STATES PATENTS

| | | |
|---|---|---|
| 811,035 | Chidester | Jan. 30, 1906 |
| 887,962 | Reisner | May 19, 1908 |
| 889,966 | Rausch et al. | June 9, 1908 |
| 1,120,403 | O'Leary | Dec. 8, 1914 |
| 1,432,243 | Harris | Oct. 17, 1922 |
| 1,967,039 | Mohr | July 17, 1934 |
| 2,275,315 | Ray | Mar. 3, 1942 |
| 2,285,717 | Indge | June 9, 1942 |
| 2,490,594 | Madden | Dec. 6, 1949 |
| 2,544,304 | Eckenbeck | Mar. 6, 1951 |